United States Patent
Ozer

(10) Patent No.: US 7,410,096 B2
(45) Date of Patent: Aug. 12, 2008

(54) MIDDLEWARE APPLIANCE FOR SCALABLE AND RELIABLE AUTOMATED IDENTIFICATION

(75) Inventor: Nissim Ozer, Las Vegas, NV (US)

(73) Assignee: RF Code, Inc., Austin, TX (US)

( * ) Notice: Subject to any disclaimer, the term of this patent is extended or adjusted under 35 U.S.C. 154(b) by 0 days.

(21) Appl. No.: 10/863,010

(22) Filed: Jun. 7, 2004

(65) Prior Publication Data

US 2005/0269394 A1 Dec. 8, 2005

(51) Int. Cl.
*G06F 17/00* (2006.01)

(52) U.S. Cl. ............... 235/375; 340/10.1; 340/572.1

(58) Field of Classification Search ............ 235/375; 340/10.1, 10.3, 10.31, 10.32, 10.5, 10.51, 340/572.1, 572.4
See application file for complete search history.

(56) References Cited

U.S. PATENT DOCUMENTS

| | | | | |
|---|---|---|---|---|
| 5,434,572 A | * | 7/1995 | Smith | 342/44 |
| 5,673,037 A | * | 9/1997 | Cesar et al. | 340/10.32 |
| 5,777,561 A | * | 7/1998 | Chieu et al. | 340/10.32 |
| 6,088,659 A | | 7/2000 | Kelley et al. | |
| 6,831,562 B2 | | 12/2004 | Rodgers et al. | |
| 6,996,402 B2 | * | 2/2006 | Logan et al. | 455/456.1 |
| 7,075,436 B2 | * | 7/2006 | Shanks et al. | 340/572.1 |
| 7,183,926 B2 | | 2/2007 | Diorio et al. | |
| 2002/0007325 A1 | | 1/2002 | Tomon | |
| 2002/0158765 A1 | | 10/2002 | Pape et al. | |
| 2002/0188522 A1 | | 12/2002 | McCall et al. | |
| 2003/0038172 A1 | | 2/2003 | Bodin et al. | |
| 2003/0222141 A1 | | 12/2003 | Vogler et al. | |
| 2004/0024768 A1 | | 2/2004 | Haller | |
| 2005/0212660 A1 | | 9/2005 | Hansen et al. | |
| 2005/0236479 A1 | | 10/2005 | Schmidtberg et al. | |
| 2006/0022815 A1 | | 2/2006 | Fischer et al. | |

* cited by examiner

*Primary Examiner*—Daniel A Hess

(57) ABSTRACT

In a system for automatic identification, a method performed by an appliance coupled to a network balances load among appliances. The network includes a plurality of tags, a plurality of readers that read the tags, and a plurality of appliances. The appliances service the readers to provide information for a server, also coupled to the network. The server performs an application program in accordance with the information. The method includes in any order: (a) determining an unallocated capacity for service by the appliance; (b) determining a load for servicing a reader of the plurality; and (c) if the load fits within the unallocated capacity, providing a signal to the network for another appliance of the plurality, the signal for indicating that the appliance can service the reader. Another method performed by an appliance includes in any order: (a) determining a figure of merit of communication between tags and readers; (b) sending information for a reader to adjust communication with the tags in accordance with the information.

7 Claims, 5 Drawing Sheets

| APPLIANCES | 302 |
|---|---|
| APPLIANCE ID | |
| DESCRIPTION | |
| CAPACITY RMS TOTAL | |
| CAPACITY RMS UNALLOCATED | |
| CAPACITY PEAK TOTAL | |
| CAPACITY PEAK UNALLOCATED | |
| NETWORK ID | |

| READERS | 308 |
|---|---|
| READER ID | |
| DESCRIPTION | |
| LOAD RMS | |
| LOAD PEAK | |
| NETWORK ID | |

Fig. 3C

| LOCATIONS | 318 |
|---|---|
| LOCATION ID | |
| DESCRIPTION | |
| LATITUDE | |
| LONGITUDE | |
| ELEVATION | |

Fig. 3F

| ACTUATORS | 310 |
|---|---|
| ACTUATOR ID | |
| DESCRIPTION | |
| NETWORK ID | |

Fig. 3D

| SENSORS | 312 |
|---|---|
| SENSOR ID | |
| DESCRIPTION | |
| NETWORK ID | |
| LOAD RMS | |
| LOAD PEAK | |

Fig. 3E

MIDDLEWARE APPLIANCE FOR SCALABLE AND RELIABLE AUTOMATED IDENTIFICATION

FIELD OF THE INVENTION

Embodiments of the present invention relate to automated identification and data collection.

BACKGROUND OF THE INVENTION

Conventional automated identification systems may in addition perform data collection functions. Such systems typically include tags, readers, and computer systems that perform application programs generally for monitoring the position and movement of tagged items, persons, and animals. These systems have wide utility in personal, commercial, government, education, and scientific fields including, for example, managing inventory (e.g., auto parts, mail, baggage), capturing point of sale transactions (e.g., groceries, utility meters), capturing product life cycle information (e.g., truck tires), controlling access to facilities and equipment by authorized persons, and monitoring the movements of vehicles, livestock, prisoners, soldiers, children, and employees, to name a few applications. Information and statistics from automated identification systems may support business decision making (e.g., throughput planning, insurance claims, valuation of a business, improvement of a supply chain).

Readers and computer systems coupled to the readers for performing application programs represent functionality installed at an investment cost that is generally returned over time by the value of the automated identification and data provided by the system. It is desirable to reuse this installed investment as additional applications for automated identification and/or data collection are discovered. One approach is to upgrade readers and computer systems to read additional types of tags and process additional types of information. Typically, upgrading software is less expensive than upgrading hardware.

Unfortunately, software for use in automated identification systems is difficult to design, deploy, and upgrade in part because determinations that are fundamental to system functions are generally made in the application program. For example, readers that report raw data to an application program place the burden of raw data analysis on the application program for an increasing quantity and perhaps decreasing quality of raw data as the number of readers in an installation increases. Raw data communication may also adversely consume the capacity of communication media including wired and wireless networks between readers and computer systems performing the application programs. The fundamental notion of the location of a tag is typically determined in the application program based on the identity of the tag, the identity of the reader reporting the tag, and the installed location of the reader. Another fundamental notion, to control equipment in the neighborhood of the tag, is conventionally accomplished by the application program. Consequently, there remains a need to reserve to the application program operating in an upper layer of the system those functions that are unique to the application (e.g., inventory replenishment thresholds) and to perform in a lower layer of the system functions that may be useful in one or more of several applications (e.g., reporting the location of a tagged item).

As automated identification systems expand to cover more items, it is desirable to be able to add equipment and software with a minimum of reconfiguration of existing equipment and software. It is also desirable to add diverse readers and diverse application programs with a minimum of reconfiguration of the existing investment as new applications in the same locations are identified. For example, an employer's system may initially control access to facilities by employees. Later the employer may desire to perform operations research and/or capital equipment utilization research. These additional applications may require diverse tags, diverse readers, and additional application program resources. It is desirable to make these additional application programs operable with a minimum of additional investment.

Without systems and methods according to various aspects of the present invention, the proliferation and integration of reliable and scalable automated identification and data collection systems will be impeded. Consequently, the costs of such systems will not reflect greater economies of scale. Benefits to the public will not be realized including material benefits of lower costs of goods (e.g., owing to less shrinkage), lower costs of services (e.g., package delivery), and other benefits (e.g., lower the risk of losses due to ineffective security).

SUMMARY OF THE INVENTION

A method, in an implementation according to various aspects of the present invention, may be performed by a server coupled to a network. The network may include a plurality of tags, a plurality of readers that read the tags, a plurality of appliances that service the readers to provide information, and a plurality of actuators responsive to the appliances. The server performs an application program in accordance with the information. The method includes in any order: (a) sending via the network a rule for use by an appliance of the plurality, the rule having a subject and a predicate, the subject specifying a criteria, the predicate specifying an action to be taken in response to the criteria being met; and (b) receiving via the network identification of a particular tag of the plurality of tags, the appliance having applied the rule with respect to the particular tag. Applying the rule includes in any order: (1) meeting the criteria in accordance with information from a particular reader of the plurality regarding the tag and ascertaining a physical location, the subject of the rule being insufficient to identify the particular reader; and (2) to accomplish the action, activating a particular actuator of the plurality in accordance with the location, the predicate of the rule being insufficient to identify the particular actuator.

A method, in another implementation according to various aspects of the present invention, may be performed by an appliance coupled to a network. The network includes a plurality of tags, a plurality of readers that read the tags, and a plurality of appliances. The appliances service the readers to provide information for a server, coupled to the network. The server performs an application program in accordance with the information. The method includes in any order: (a) determining an unallocated capacity for service by the appliance; (b) determining a load for servicing a reader of the plurality; and (c) if the load fits within the unallocated capacity, providing a signal to the network for another appliance of the plurality, the signal for indicating that the appliance can service the reader.

A method, in another implementation according to various aspects of the present invention, may be performed by an appliance coupled to a network. The network includes a plurality of tags, a plurality of readers that read the tags, and a plurality of appliances. The appliances service the readers to provide information for a server, coupled to the network. The server performs an application program in accordance with the information. The method includes in any order: (a) determining a figure of merit of communication between tags and readers; (b) sending information for a reader to adjust communication with the tags in accordance with the information.

BRIEF DESCRIPTION OF THE DRAWING

Embodiments of the present invention will now be further described with reference to the drawing, wherein like designations denote like elements, and:

FIG. 3A–3F is an entity relationship diagram for a portion of the data stored in the system of FIG. 1;

DETAILED DESCRIPTION OF THE PREFERRED EMBODIMENTS

A system in an exemplary implementation according to various aspects of the present invention provides improved monitoring, tracking, and/or control solving the problems discussed above. Monitoring, tracking, and control may employ any conventional automated identification technology, any conventional open loop or closed loop control technology, and may further include any conventional data collection, analysis, storage, and reporting technology. The functions of such a system may be divided into two or more layers, each layer including one or more engines.

An engine may be implemented with any conventional combination of integrated circuits, circuit modules, processors, memory devices (e.g., semiconductor, magnetic, and optical data storage subsystems), firmware, and/or software. Data communication between layers may include any conventional communication technology including point-to-point, bus, and network technologies for cooperation of the engines' processors and processes. Bus and network technologies generally provide communication via links for any mix of one to one, one to many, many to one, and many to many relationships. A link may be physical and/or logical, and may be temporary (e.g., as needed or shared) or permanent (e.g., dedicated).

A logical link may be implemented between at least two software components. A component herein refers to a modular package of processes and data (e.g., classes and objects in the object oriented paradigm). The component generally includes processes forming an interface (i.e., exposed processes) for use of the component by other components. Data of a component is accessed (at least initially) only via one or more exposed processes. In this way, data and unexposed processes are said to be encapsulated in the component.

Encapsulation generally provides functional independence between components and engines. Improved scalability and reliability result from use of independent engines. For example, when a first engine communicates via a logical link with a second engine, both engines may actually be implemented with any number of parallel engines (e.g., for high throughput) and redundant engines (e.g., for failure detection by voting, and automatic fail-over). For example, increasing the capacity or improving the reliability of the first engine may involve installing an additional engine (e.g., in parallel or redundant) with no change to the second engine.

Systems according to various aspects of the present invention encapsulate location information at a layer below the application layer of the system.

Figure 1:
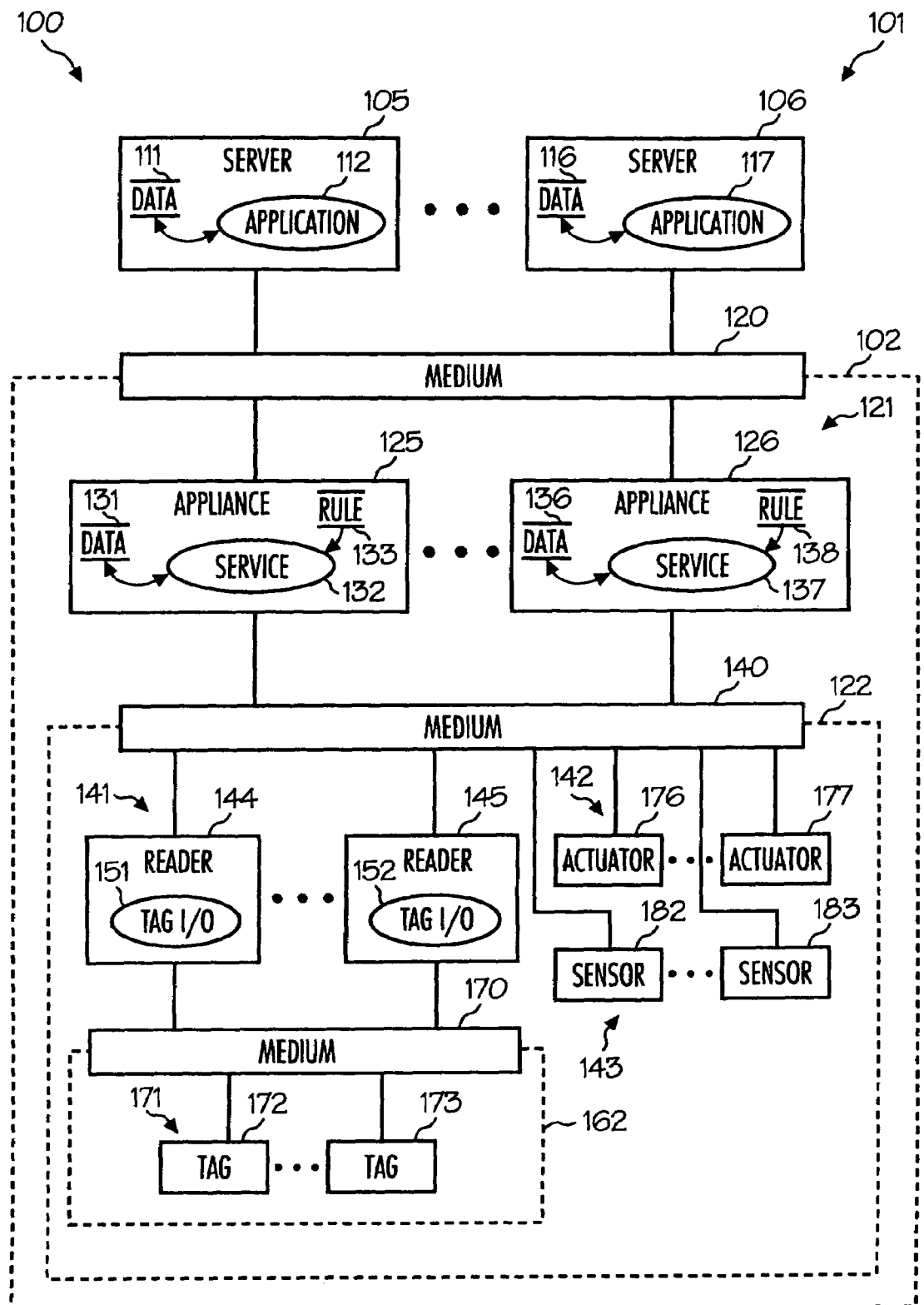
FIG. 1 is a functional block diagram of an automated identification and data collection system according to various aspects of the present invention.
Figure 2:
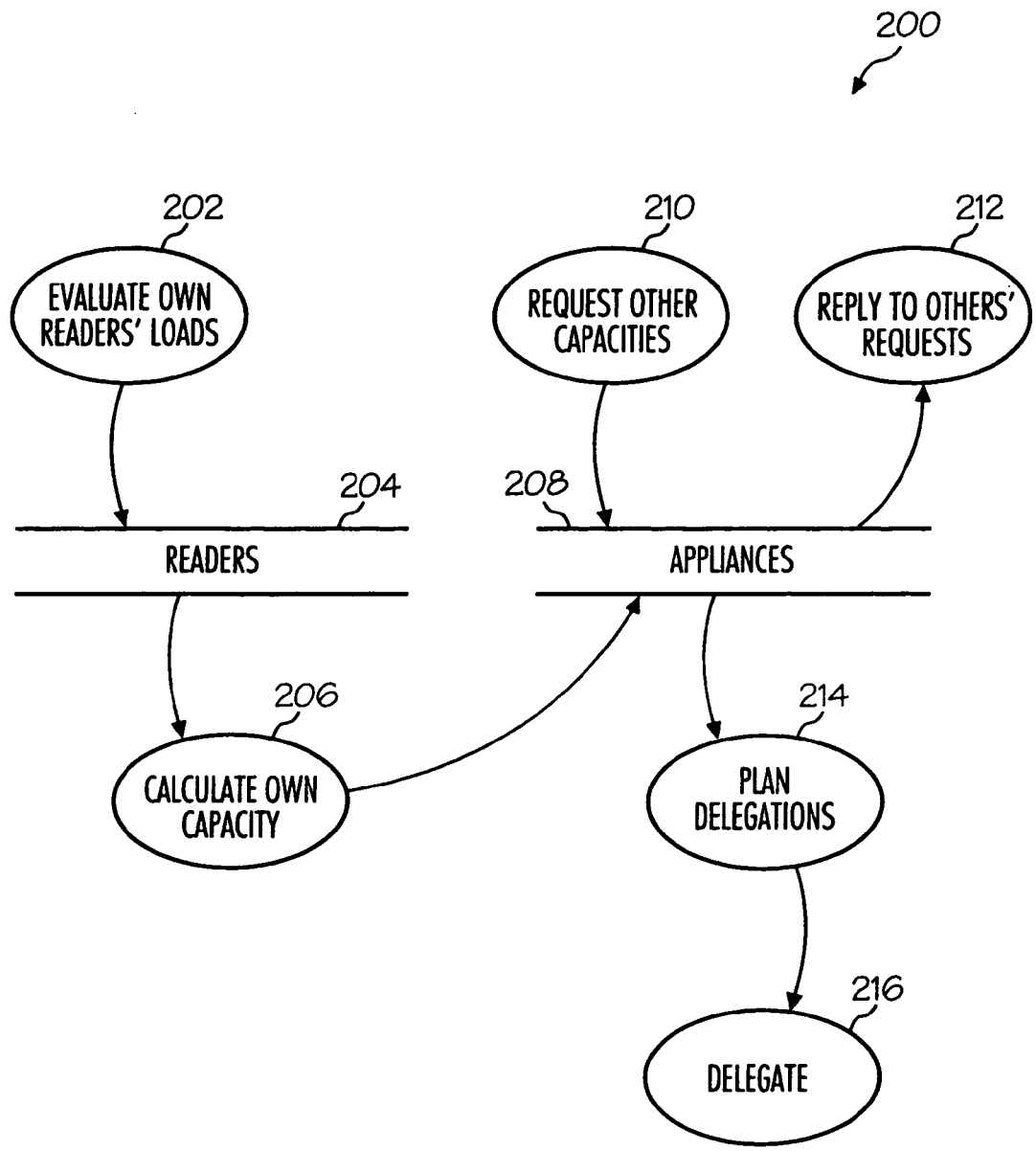
FIG. 2 is a data flow diagram of a method for load balancing in the system of FIG. 1.
Figures 3A, 3B:
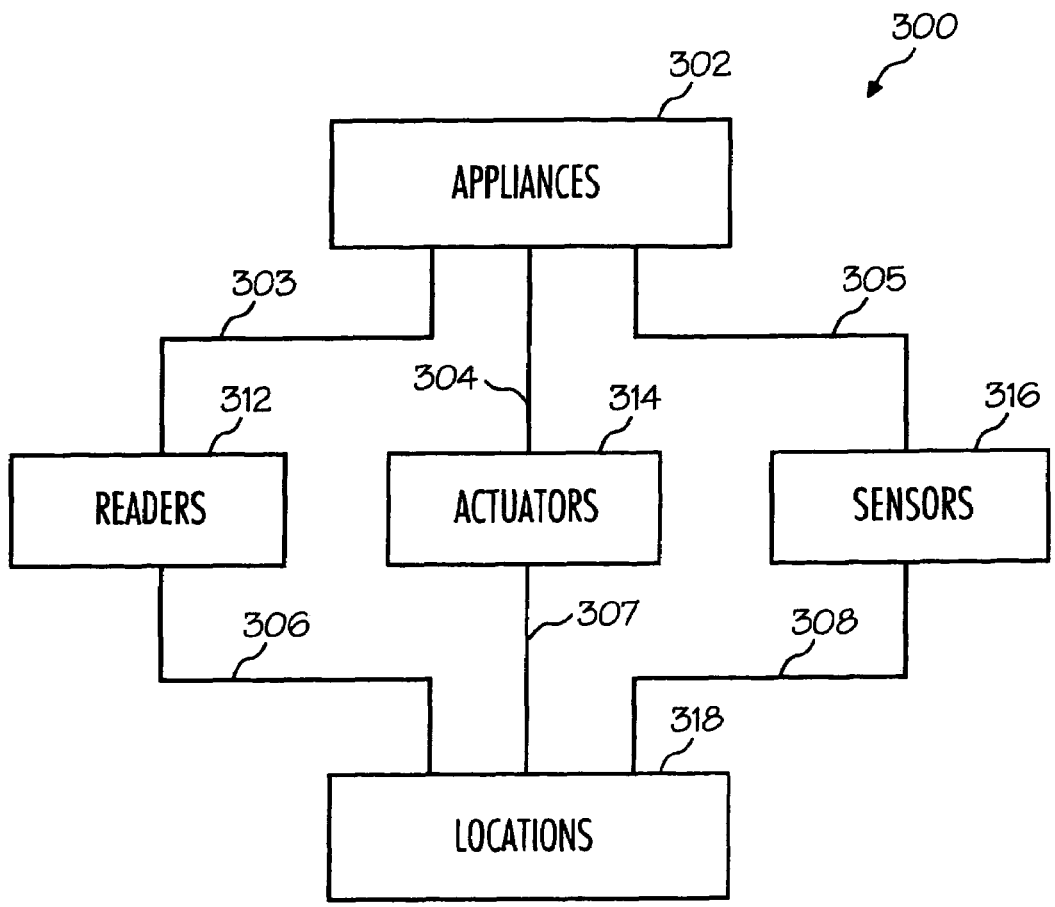
Figure 4:
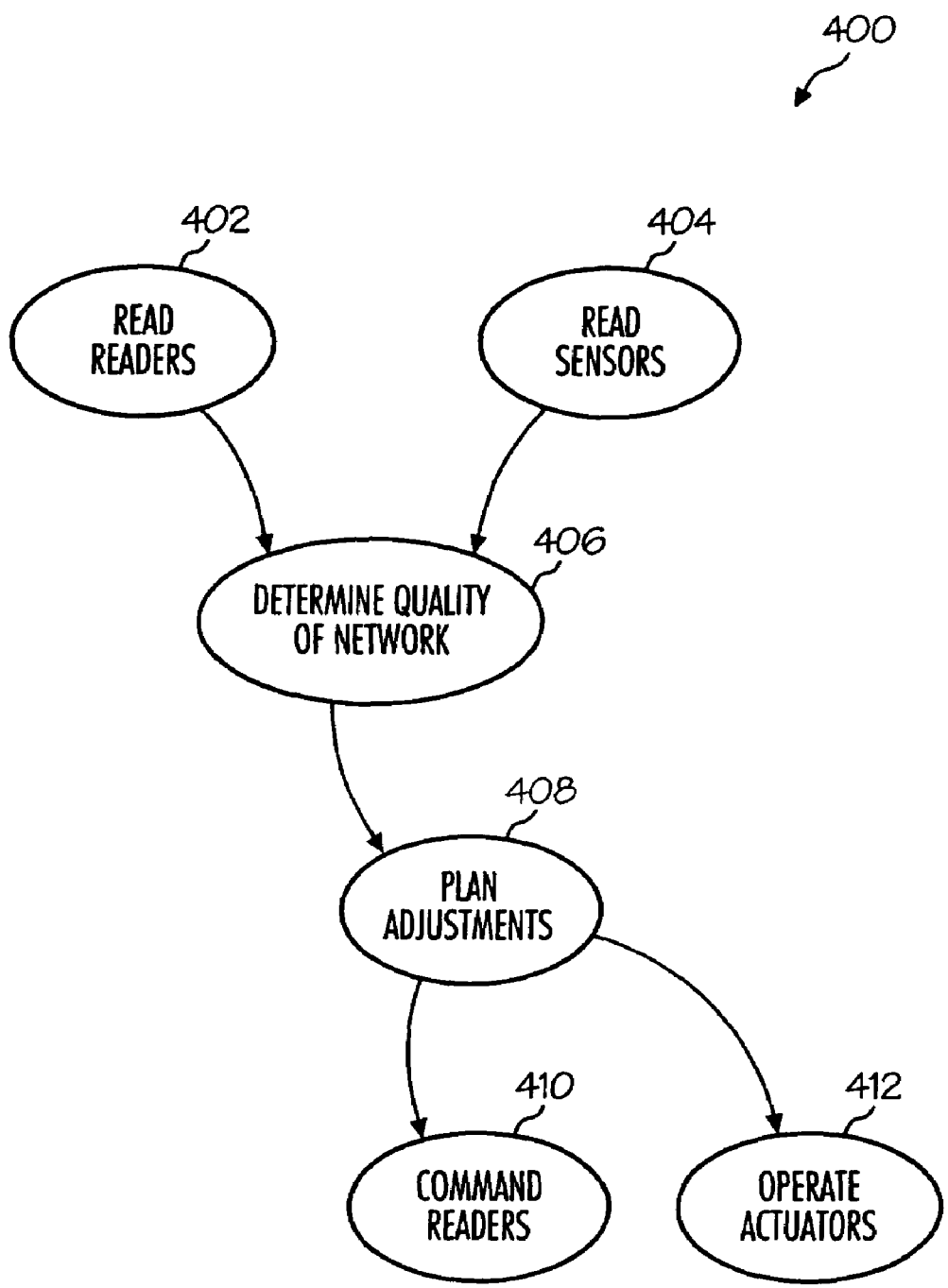
FIG. 4 is a data flow diagram of a method for improving reliability in the system of FIG. 1.

For example, system 100 of FIGS. 1–4 includes an application layer, an appliance layer, a monitoring and control layer, and an identification layer. The application layer includes one or more engines for performing functions unique to an application (e.g., inventory management). For example, the application layer of system 100 includes one engine implemented on a set of servers 101, each server performing a copy of an application program with access to a copy of a data store. Application layer 101 includes server 105 performing application program 112 with access to data store 111; and server 106 performing application program 117 with access to data store 116. Servers 105 and 106 represent any number of servers cooperating to perform application functions in a parallel and/or redundant manner as discussed above. Each server has access via a network 102 that includes lower layer engines.

Network 102 includes a medium 120 for logical links between the application engine and lower layer engines. Links of medium 120 may be implemented with conventional discovery, naming, and session technology, for example for many-to-many relationships among servers and appliances. In one implementation and/or mode of operation, servers relate to appliances in a server/client modality. In another implementation and/or mode of operation, servers and appliances relate as peers.

The appliance layer includes one or more engines for performing services separated from the application layer to improve scalability and separated from the monitoring and control layer to implement compatibility with diverse and legacy readers, actuators, and sensors. For example, the appliance layer of system 100 includes one engine implemented on a set of appliances 121, each appliance performing a copy of a services process with access to a copy of a data store. Appliance layer 121 includes appliance 125 performing service process 132 with access to data store 131; and appliance 126 performing service process 137 with access to data store 136. Appliances 125 and 126 represent any number of appliances cooperating to perform appliance functions in a parallel and/or redundant manner as discussed above. Each appliance has access via a network 122 that includes lower layer engines.

Network 122 includes a medium 140 for logical links between the appliance engine and lower layer engines. Links of medium 140 may be implemented with conventional discovery, naming, and session technology, for example for many-to-many relationships among appliances and readers, actuators, and/or sensors. In one implementation and/or mode of operation, appliances relate to readers, actuators, and/or sensors in a server/client modality. In another implementation and/or mode of operation, appliances, readers, actuators, and sensors relate as peers.

According to various aspects of the present invention, an application engine sends one or more rules to an appliance engine. A rule may specify data to be made available to the application engine, for example, by a conventional subscription. A rule may specify a conditional subscription in terms of a subject and predicate. The subject may specify criteria (e.g., a logical combination of one or more conventional events). The predicate may specify an action (e.g., one or more conventional alerts) to be performed (or scheduled for performance according to priority). The rule may be evaluated according to a priority associated with the rule and/or criteria (e.g., when data relevant to the criteria become available). Designation of which of several appliances is to store and/or act on a particular rule is typically out of the scope of control of the application engine. In one implementation, rule store 133 (for process 132) and rule store 138 (for process 137) are maintained as identical copies.

The appliance engine determines, monitors, and maintains accurate location information (e.g., in data stores 131 and 136) describing the location of tags, readers, actuators, and sensors. The determination of a location or change in location may give rise to an event. Location information may be absolute (e.g., within a region of a floor of a building) or relative to other tags, readers, actuators, and/or sensors (e.g., within a predefined range, for example 2 meters). Because appliance engines encapsulate location information, location information may be determined in diverse ways with no change to application engines. For instance, a table of fixed locations may be accessed by an appliance engine to determine the location of a reader; or the reader may report its location (e.g., configured at fixed installation, or as determined with access to a global positioning system co-located with the reader).

Consequently, rules may refer to tags, readers, actuators, and/or sensors with reference to an absolute or relative location. For example, a rule may make and absolute reference to a reader on the 2nd floor of the Headquarters building; or, using a relative reference, refer to an actuator that is within a range (e.g., 2 meters) of such a reader or that is at a unique distance (e.g., closest) to such a reader. By referring to a tag, reader, actuator, or sensor with reference to a location, the actual tag, reader, actuator, or sensor may be implemented with parallel and or redundant physical tags, readers, actuators, or sensors providing benefits of scalability and reliability as discussed above. Appliance engine 121 may present diverse readers, actuators, sensors, and tags in an identical manner to application engine 101 permitting the introduction of diversity (e.g., a capability upgrade or integration of existing systems) with no change to the application engine.

The monitoring and control layer includes physically distributed engines for monitoring physical regions for the presence and movement of tagged items (e.g., objects, persons, vehicles, animals), for effecting physical controls in regions (e.g., opening locks on doors, directing surveillance cameras, performing materials handling, vending, providing signals for human interfaces), and for gathering physical measurements from regions (e.g., temperature, traffic counts, audio surveillance, video surveillance). Actuators and sensors may be combined to implement any conventional operator interface (e.g., cash registers, graphical user interfaces, voice recognition, telephone answering, video conferencing). For example, the monitoring and control layer of system 100 includes one or more readers 141, one or more actuators 142, and one or more sensors 143. Readers 141 include reader 144 performing tag I/O process 151 and reader 145 performing tag I/O process 152. Readers 141 may be functionally diverse or identical, co-located or physically distributed throughout one or more regions. Actuators 142 include actuator 176 and actuator 177 that may be functionally diverse or identical, co-located or physically distributed throughout one or more regions. Sensors 143 include sensor 182 and sensor 183 that may be functionally diverse or identical, co-located or physically distributed throughout one or more regions. One or more readers, actuators, and sensors may co-located to implement an interface for the application. For example, for facility access, a badge reader, door lock actuator, video surveillance sensor, and audio interface (microphone and speaker) may be implemented in close proximity. Readers, 141, actuators 142, and sensors 143 represent any number of units cooperating to perform monitoring and control functions in a parallel and/or redundant manner as discussed above. Each reader has access to a network 162 that includes lower layer engines.

Network 162 includes a medium 170 for logical links between readers 141 and the identification layer of system 100. Links of medium 170 may be implemented in any manner compatible with tags 171. Links may include discovery, naming, and session technology, for example, for many-to-many relationships among readers and tags. Readers and tags may communicate in any conventional manner. Readers may include transmitters that stimulate tags to initiate communication and/or provide location information to tags. These readers are typically used with other readers having receivers to complete automatic identification and data collection from tags. Readers may also include receivers that scan one or more channels at one or more times to detect signals from tags, and transceivers that interrogate tags.

The identification layer includes tags and devices that perform primitive automatic identification and data collection functions. Tags 171 include tag 172 and tag 173 that may be functionally diverse or identical. Tags 172 and 173 represent any number of co-located or physically distributed tags. Tags may be stationary and/or mobile. Tags may provide reference signals, identification signals, and/or send and receive information stored in tags. Tags may include sensors and/or actuators. In various implementations, communication via medium 170 includes conventional radio frequency identification (RFID), conventional smart card interfaces (e.g., contacts), and scanner interfaces (e.g., magnetic strip and bar code). Tags may emit signals (e.g., infrared), reflect (e.g., back scatter), or absorb signals to convey information.

Objects, persons, and animals to be identified, monitored, tracked, and/or controlled may be physically associated with a tag (e.g., attached to the object, person, or animal). In another implementation, objects, persons, and animals are associated with a reader (e.g., attached or carried on or in the object, person, or animal). In this latter implementation, the information layer includes readers (not shown) with functions as discussed above.

Operation of the appliance encapsulates all aspects of readers, actuators, sensors, and tags. Consequently, services performed by the appliance are scalable and made more reliable primarily by adding appliances to the system with little or no change to application programs. Diverse tags and diverse readers may be supported by adding functionality to the appliances with little or no change to application programs. Application program functions are also scalable and new application programs may be added with little or no change to the networks, appliances, readers, actuators, sensors, and tags.

Location information is encapsulated below the application layer, as discussed above. Any other information from the identification layer is also encapsulated including, for example, tag identification; tag communication protocol, state, and signal strengths; and tag memory contents (if any). Consequently, the information layer functions for an object may be implemented in a scalable and reliable manner using parallel and/or redundant tags (e.g., diverse tags) associated with the object. In other implementations, information layer functions for an object may include parallel and/or redundant readers alone or with tags.

According to various aspects of the present invention, system 100 performs load balancing among appliances 121 in a manner that is transparent to application layer 101. In one implementation, each appliance determines whether a change in responsibility for servicing any reader, actuator, or sensor may bring about a more uniform distribution of service functions among appliances (e.g., any subset or all appliances);

initiates communication among appliances to accomplish such change, and cooperates with other appliances that may initiate other changes.

For example, in appliance 125, service process 132 cooperates with data store 131 and communicates with other appliances via medium 140 (or 120) to accomplish analysis and delegation for load balancing. Service process 132 (and 137) may include load balancing process 200 of FIG. 2. Data store 131 (and 136) may include data structures 300 of FIG. 3. Process 200 includes evaluate own readers' loads process 202, calculate own capacity process 206, request other capacities process 210, reply to others' requests process 212, plan delegations process 214, and delegate process 216. Each process may be performed whenever sufficient data is available (e.g., a multitasking environment).

Evaluate own readers' loads process 202 estimates a load value in a unit of measure suitable for comparing to a capacity value describing the capacity to service readers from appliance 125. The load value represents a forecast of expected load to occur in a predetermined future time interval (e.g., during the next 10 minutes). A suitable unit of measure may be messages (or packets) per second for messages of generally equal complexity (or length). An average value may be used (e.g., a root-mean-square average). Historical data may be used, such as a moving average. Load values may be based on load experienced in a suitable interval in the past (e.g., a comparable interval an hour ago, a day ago, or a week ago). In one implementation, both an RMS and a peak value are calculated from historical data. Historical data may be acquired from examining message queues where each message is associated with a time received (or enqueued). Load values may be stored (e.g., in readers store 204) in association with each reader being serviced by appliance 125. In another implementation, load values for actuators and sensors are also estimated and stored in an analogous manner.

Calculate own capacity process 206 estimates a capacity value in a unit of measure suitable for comparing to a load value, discussed above. The capacity value represents a forecast of expected capacity to be available for processing messages from readers in a predetermined future time interval (e.g., during the next 10 minutes). A suitable unit of measure may be messages (or packets) per second for messages of generally equal complexity (or length). An average value may be used (e.g., a root-mean-square average). Historical data may be used, such as a moving average. Capacity values may be based on capacity consumed in a suitable interval in the past (e.g., a comparable interval an hour ago, a day ago, or a week ago). In one implementation, both an RMS and a peak value are calculated from historical data. Historical data may be acquired from examining message dequeueing logs where each logged dequeueing operation is associated with a time completed. Capacity values may be stored at each appliance in association with each appliance for analysis of unallocated capacity of each of several appliances. An unallocated capacity may be determined from an estimated capacity reduced to account for estimated load from each reader being serviced by appliance 125. Estimated loads may be read from readers store 204. In another implementation, capacity values for servicing actuators and sensors are also estimated and stored in an analogous manner.

Request other capacities process 210 communicates with other appliances (e.g., 126) and records in appliances store 208 each estimated capacity as discussed above received in response to the request. Process 210 may make default or zero entries in appliances store 208 for unallocated capacities requested but not timely provided (e.g., due to other appliance too busy to respond). Process 210 may also request others' estimated loads for readers (actuators and sensors) assigned to the others' appliances. Results may be stored in readers (actuators and sensors) store 204.

Reply to others' requests process 212 reports capacity values to other appliances. Process 212 may read appliances store 208 and prepare suitable messages (e.g., directed or broadcast) in response to requests. In another implementation, process 212 periodically broadcasts estimated capacity values from store 208. Various values for the period between broadcasts may be used with more frequent broadcasts prior to anticipated busy times.

Plan delegations process 214 determines a load balancing plan based on the unallocated capacity of each appliance and the loads presented by readers (e.g., local to appliance 125). A conventional load balancing strategy may be used. To assure that all appliances are operating from the same or compatible portions of a load balancing strategy, appliance 125 may broadcast information identifying and/or describing the plan process 214 has determined. Balancing by and for appliance 125 may be planned with a goal to leave unallocated capacity in each appliance in proportion to a total estimated peak load, and/or a total estimated RMS load expected to be needed at this appliance (125). Some delegations in a series of planned delegations may appear to further unbalance the load.

Delegate process 216 assures a complete transition of a reader from a first appliance to a second appliance resulting in no lost messages. In one implementation, readers retain a log of received tag information and discard a portion of the log only when instructed to so by an appliance. In this way, tag information originally sent to a now failed appliance can be resent to an operational appliance. Cooperation between appliances to accomplish a delegation may include stopping a subscription for data from a reader sent to the first appliance, starting a subscription for data from the reader to the second appliance.

In another implementation, a failed appliance may be detected. In response to discovery of a failed appliance, an appliance with suitable capacity may reassign a reader (actuator or sensor) from the failed device to the operating appliance itself.

A data structure according to various aspects of the present invention may be referred to by any process involved in analysis and delegation for load balancing, as discusses above. A database may include lists of records having the same structure (e.g., values for the same purpose indicated by a field name). Any two or more values of a data structure (e.g., a record) comprise a tuple by implementing an association (e.g., a relationship) between the values. For example, a database 300 of FIGS. 3A–3F for use by any appliance (125) implements readers store 204 and appliances store 208 and may be stored in data store 131 and mirrored on any other data store (e.g., 137). Database 300 includes lists of records for appliances 302, readers 312, actuators 314, sensors 316, and locations 318. Each relationship between lists of records (303–308) may be implemented as a cross reference list associating keys from each list. Each such cross reference list supports many-to-many relationships as may be desired.

A value unique to each record that may serve as a key for indexed access to the respective list is called an ID (short for identifier), for example, Appliance ID, Reader ID, Actuator ID, Sensor ID, and Location ID. A Description field may include any number of fields for particular descriptive information. For example, a description may include a "type" value to classify listed information. A Network ID is a unique identifier to be used in network communication via media 140. Communication from an appliance with each other appliance, reader, actuator, and sensor is facilitated by unique network addresses. Listed location values may be determined from a receiver for conventional Global Positioning System signals associated with the reader, actuator, or sensor.

System 100 may dynamically control communication between information layer 162 and readers 141 to provide greater reliability than offered by conventional automatic identification systems. For example, a service process (e.g., 132) performed by one or more appliances 121 may include a process 400 of FIG. 4 that plans and implements adjustments to communication. Readers 141 and/or sensors 143 may provide information (402, 404) to determine (406) a figure of merit or quality of communication. Adjustments may be planned (408) and plans may be implemented by commanding readers (410) to adjust communication via medium 170 and/or by operating (412) actuators 142 that affect changes in communication via medium 170.

In one implementation, one or more readers 141 analyze communication via medium 170 and report statistics to one or more appliances. An appliance may subscribe to receive such reports from one or more readers. Statistics may include indications of network utilization as a percent of a predetermined period (e.g., past 5 minutes). Percentages may include a percent for time not receiving because no signal is within range of signal strength, a percent for time receiving within suitable ranges of signal strength and accuracy, and a percent for time receiving within suitable signal strength but without suitable accuracy. Messages may be counted and a ratio may be calculated and reported. For a predetermined period (e.g., 5 minutes) a quantity of messages received with suitable accuracy is divided by a quantity of all messages attempted to be received (e.g., including incomplete messages and inaccurate messages). A noise floor measurement may be made and reported when the reader determines that the medium is probably free of all messages. A noise floor measurement may be made and reported when the appliance determines from sensors (e.g., a spectrum analyzer) that the medium (or a particular channel of interest) is probably free of all messages. The range of signal strengths of signals received with suitable accuracy may be determined and reported.

Commands to readers that may affect improved communication via medium 170 may include commands to change transmitter modulation, message length, message timing, transmitting channel(s), and/or transmitted signal strength to avoid particularly busy or noisy frequency ranges or time periods. Commands may also affect more suitable cooperation among transmitting entities (readers and/or tags) by commanding revised timing parameters that may be more suitable to the total number of transmitting entities competing for use of medium 170. A failing transmitter or receiver (in a tag or reader) may be commanded to be reset or temporarily disabled.

Actuators that may affect improved communication via medium 170 may include direct and/or indirect actions. Power supplies that supply power to one or more readers may be cycled to reset or temporarily disable transmitters and receivers. When tags receive power via transmissions, an actuator may analogously cycle power to tags or temporarily disable tags. Antenna switches and antenna positioning subsystems for readers may be operated by actuators. In other suitable situations, it may be determined by trial and error or by analysis and/or test that a movable object, person, or animal may be interfering with communication. Actuators may be operated to move the object, person, or animal, or have it moved (e.g., an audio message broadcast at a suitable location).

The foregoing description discusses preferred embodiments of the present invention which may be changed or modified without departing from the scope of the present invention as defined in the claims. While for the sake of clarity of description, several specific embodiments of the invention have been described, the scope of the invention is intended to be measured by the claims as set forth below.

What is claimed is:

1. A method performed by a server coupled to a network, the network comprising a plurality of tags, a plurality of readers that read the tags, a plurality of appliances that service the readers to provide information, and a plurality of actuators responsive to the appliances, the server for performing an application program in accordance with the information, the method comprising:

sending via the network a rule for use by an appliance of the plurality, the rule having a subject and a predicate, the subject specifying a criteria, the predicate specifying an action to be taken in response to the criteria being met; and receiving via the network identification of a particular tag of the plurality of tags, the appliance having applied the rule with respect to the particular tag, wherein applying the rule includes:

(1) meeting the criteria in accordance with information from a particular reader of the plurality regarding the tag and ascertaining a physical location, the subject of the rule being insufficient to identify the particular reader; and (2) to accomplish the action, activating a particular actuator of the plurality in accordance with the location, the predicate of the rule being insufficient to identify the particular actuator.

2. The method of claim 1 wherein the location is of the particular tag.

3. The method of claim 1 wherein the location is of the particular reader.

4. The method of claim 1 wherein the location is of the particular actuator.

5. The method of claim 1 wherein receiving further comprises receiving the location in association with the identification.

6. The method of claim 1 wherein accomplishing the action further includes ascertaining an identity of a particular actuator in accordance with the location and activating the particular actuator of the plurality in accordance with the identity of the particular actuator.

7. A memory device comprising indicia of instructions for performing the method of claim 1.

* * * * *